United States Patent
Hoang et al.

(10) Patent No.: US 10,851,203 B2
(45) Date of Patent: *Dec. 1, 2020

(54) POLYETHER POLYMER COMPOSITION

(71) Applicant: ZEON CORPORATION, Tokyo (JP)

(72) Inventors: The Ban Hoang, Tokyo (JP); Shigetaka Hayano, Tokyo (JP); Keisuke Ohta, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 93 days.

This patent is subject to a terminal disclaimer.

(21) Appl. No.: 16/088,252

(22) PCT Filed: Mar. 27, 2017

(86) PCT No.: PCT/JP2017/012336
§ 371 (c)(1),
(2) Date: Sep. 25, 2018

(87) PCT Pub. No.: WO2017/170367
PCT Pub. Date: Oct. 5, 2017

(65) Prior Publication Data
US 2019/0276600 A1    Sep. 12, 2019

(30) Foreign Application Priority Data

Mar. 31, 2016    (JP) .................. 2016-073480

(51) Int. Cl.
| | | |
|---|---|---|
| C09D 7/61 | (2018.01) | |
| C08G 65/333 | (2006.01) | |
| C09D 7/40 | (2018.01) | |
| C08G 65/24 | (2006.01) | |
| C08K 3/08 | (2006.01) | |
| C08K 3/22 | (2006.01) | |
| C08K 3/38 | (2006.01) | |
| C09D 5/24 | (2006.01) | |
| C09D 171/03 | (2006.01) | |
| C09K 5/14 | (2006.01) | |
| C08L 71/02 | (2006.01) | |
| C08K 3/28 | (2006.01) | |
| H01B 1/22 | (2006.01) | |

(52) U.S. Cl.
CPC ....... *C08G 65/33317* (2013.01); *C08G 65/24* (2013.01); *C08K 3/08* (2013.01); *C08K 3/22* (2013.01); *C08K 3/28* (2013.01); *C08K 3/38* (2013.01); *C08L 71/02* (2013.01); *C09D 5/24* (2013.01); *C09D 7/61* (2018.01); *C09D 7/68* (2018.01); *C09D 7/69* (2018.01); *C09D 171/03* (2013.01); *C09K 5/14* (2013.01); *H01B 1/22* (2013.01); *C08K 2003/085* (2013.01); *C08K 2003/0806* (2013.01); *C08K 2003/2296* (2013.01); *C08K 2003/385* (2013.01); *C08K 2201/001* (2013.01); *C08K 2201/006* (2013.01)

(58) Field of Classification Search
USPC ........................................... 252/74
See application file for complete search history.

(56) References Cited

U.S. PATENT DOCUMENTS

| 3,790,506 A | 2/1974 | Tillson |
|---|---|---|
| 2015/0087761 A1 | 3/2015 | Satoh et al. |
| 2019/0276666 A1* | 9/2019 | Hoang ............. C08K 3/20 |

FOREIGN PATENT DOCUMENTS

| JP | S4976950 A | 7/1974 |
|---|---|---|
| JP | S56109268 A | 8/1981 |
| JP | S5924750 A | 2/1984 |
| JP | H04248257 A | 9/1992 |
| JP | 2001302936 A | 10/2001 |
| JP | 2013227432 A | 11/2013 |
| JP | 2013231103 A | 11/2013 |
| JP | 5434795 B2 | 3/2014 |
| JP | 2014049380 A | 3/2014 |
| JP | 5839573 B2 | 1/2016 |
| JP | 2016117860 A | 6/2016 |
| WO | 2011125636 A1 | 10/2011 |
| WO | 2013099501 A1 | 7/2013 |
| WO | 2014157034 A1 | 10/2014 |

OTHER PUBLICATIONS

Nov. 15, 2019, the Extended European Search Report issued by the European Patent Office in the corresponding European Patent Application No. 17774904.1.
May 23, 2017, International Search Report issued in the International Patent Application No. PCT/JP2017/012336.
Oct. 2, 2018, International Preliminary Report on Patentability issued in the International Patent Application No. PCT/JP2017/012336.

* cited by examiner

*Primary Examiner* — Terressa Boykin
(74) *Attorney, Agent, or Firm* — Kenja IP Law PC

(57) ABSTRACT

A polyether polymer composition containing 50 parts by weight or more of a filler per 100 parts by weight of a polyether polymer composed of 10 to 200 oxirane monomer units is provided. The present invention can provide a polyether polymer composition that is capable of appropriately showing various properties of the filler such as high heat conductivity and high electrical conductivity and that also has excellent long-term stability.

10 Claims, No Drawings

POLYETHER POLYMER COMPOSITION

TECHNICAL FIELD

The present invention relates to a polyether polymer composition that is capable of appropriately showing various properties of a filler such as high heat conductivity and high electrical conductivity and that also has excellent long-term stability.

BACKGROUND ART

With a reduction in size and an increase in output power of a heat-generating electronic component such as a semiconductor device, an amount of heat per unit area generated from the electronic component has been becoming extremely large. In contrast, the heat-generating electronic component such as a semiconductor device needs to be cooled because its temperature increase causes a performance deterioration. The heat-generating electronic component is cooled by, for example, providing a cooling member such as a heat sink made of metal in a vicinity of such a heat-generating electronic component. However, there has been a problem in that a bad contact between the heat-generating electronic component and the cooling member such as a heat sink allows air to intervene in a contact portion and causes a decrease in cooling efficiency. To solve this problem, a method to bring them in contact with each other through a heat conductive material has been conventionally employed to efficiently transfer heat from the heat-generating electronic component to the cooling member such as a heat sink. When the heat conductive polymer material is used, the heat conductive polymer material intervenes at a surface boundary of the contact portion instead of the air, which allows an efficient heat transfer and consequently improves cooling efficiency.

As such a heat conductive polymer material, besides a heat conductive sheet composed of a hardened material produced by filling a silicone rubber and the like with a heat conductive filler, a heat conductive adhesive, which has flexibility and can be hardened by cross-linking, produced by filling a silicone compound having liquidity with a heat conductive filler, and also a heat conductive grease having liquidity produced by filling a liquid material such as liquid silicone with a heat conductive filler are used, for example (see Patent Document 1, for example). All these materials are produced by filling a rubber material or a liquid material as a matrix with a heat conductive filler.

In the meanwhile, as a semiconductor used for a highly integrated machine such as a supercomputer and a server recently has more and more functions, an amount of heat generated during an operation has been becoming larger and larger. For that reason, the heat conductive sheet and the heat conductive grease used for the semiconductor are expected to have better heat dissipating performance. As a method for improving the heat dissipating performance of the heat conductive sheet and the heat conductive grease, a method for improving their heat conductivity has been commonly used. However, there has been a problem in that when a polymer is filled with a large amount of the heat conductive filler to improve the heat conductivity, the heat conductive filler in the heat conductive sheet or the heat conductive grease shows poor dispersibility in some cases, and also, even when the heat conductive filler shows good dispersibility at the beginning of use, the heat conductive filler is agglomerated after long-term use and thus fails to show sufficient heat-transfer performance.

Besides the above, there has been a demand for a fine and flexible electrical wiring and electrical circuit in the field of electronic materials, and therefore a technique for printing an electrical circuit using an ink-jet printing system or the like has been studied to meet such a demand for fine and flexible products. Especially, if an electrically conductive paste or an electrically conductive ink can be printed on a surface of a target material using the ink-jet printing system or the like, a continuous printing of very fine wires for forming fine patterns becomes possible. With such a method that forms fine patterns, a production cost can be reduced significantly as compared to that of a conventional method that requires a material to undergo an etching process and a photolithography process.

As the electrically conductive paste and the electrically conductive ink which are expected to be used in the ink-jet printing system, a composition containing a polymer such as an epoxy resin and an electrically conductive filler such as a silver powder is generally used (see Patent Document 2, for example). Further, a form of the electrical circuit is fixed by thermally hardening an epoxy moiety after printing or when metal particles are melted at a time of thermally hardening, the composition is self-organized to form a metal joint portion and a thermosetting resin serves to strengthen around that portion in some cases.

Such an electrically conductive paste and an electrically conductive ink are expected to achieve high electrical conductivity even if their use in the ink-jet printing system or the like leads to a further advance in technology to produce more fine patterns. However, there has been the following problem: when a polymer is filled with a large amount of the electrically conductive filler to improve electrical conductivity, the electrically conductive filler in the electrically conductive paste or the electrically conductive ink shows poor dispersibility in some cases, and also, even when the electrically conductive filler shows good dispersibility at the beginning of use, the electrically conductive filler is agglomerated after log-term use and thus fails to show sufficient electrical conductive performance.

RELATED ART

Patent Documents

Patent Document 1: Japanese Patent No. 5434795 Patent Document 2: Japanese Patent No. 5839573

SUMMARY OF THE INVENT ION

Problem to be Solved by the Invention

The present invention was completed in view of such a situation. An object of the present invention is to provide a polyether polymer composition that is capable of appropriately showing various properties of a filler such as high heat conductivity and high electrical conductivity and that also has excellent long-term stability, and to provide a grease and a paste composed of such a polyether polymer composition.

Means for Solving the Problem

The present inventors made an extensive study to achieve the above object. The present inventors consequently found out that a composition produced by compounding a certain amount of a filler in a polyether polymer composed of a certain amount of oxirane monomer units is capable of appropriately showing various properties of the filler such as high heat conductivity and high electrical conductivity, and further, the composition is capable of effectively preventing agglomeration of the filler even after a lapse of long time and has excellent long-term stability. The present invention was completed based on the above findings.

That is, the present invention provides a polyether polymer composition containing 50 parts by weight or more of a filler per 100 parts by weight of a polyether polymer composed of 10 to 200 oxirane monomer units.

In the polyether polymer composition of the present invention, the filler is preferably a metal-containing powder, more preferably at least one selected from a metal powder, a metal oxide powder, and a metal nitride powder.

In the polyether polymer composition of the present invention, at least a part of the oxirane monomer unit included in the polyether polymer is preferably an oxirane monomer unit having a cationic group, and more preferably, the polyether polymer is composed of a monomer unit represented by the following general formula (1):

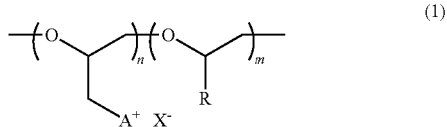
(1)

In the above general formula (1), $A^+$ represents a cationic group or a cationic group-containing group, $X^-$ represents any counter anion, R represents a non-ionic group, n is an integer of 1 or more, m is an integer of 0 or more, and n+m satisfies $10 \leq n+m \leq 200$.

In the polyether polymer composition of the present invention, the cationic group preferably contains a heterocyclic ring having a cationic nitrogen atom.

In the polyether polymer composition of the present invention, an average particle size of the filler is 0.01 μm or more and less than 50 μm.

The polyether polymer composition of the present invention is preferably a heat dissipating polymer composition.

Alternatively, the polyether polymer composition of the present invention is preferably an electrically conductive polymer composition.

Further, the polyether polymer composition of the present invention is preferably a grease form or a paste form.

Effects of Invention

The present invention can provide the polyether polymer composition that is capable of appropriately showing various properties of a filler such as high heat conductivity and high electrical conductivity and that also has excellent long-term stability.

DESCRIPTION OF EMBODIMENTS

A polyether polymer composition of the present invention contains 50 parts by weight or more of a filler per 100 parts by weight of a polyether polymer composed of 10 to 200 oxirane monomer units.
<Polyether Polymer>
A polyether polymer composing the polyether polymer composition of the present invention is a polymer composed of an oxirane monomer unit which is obtained by ring-opening polymerization of an oxirane structure part of a compound containing an oxirane structure, and the number of oxirane monomer units is 10 to 200.

Specific examples of the oxirane monomer unit include an alkylene oxide unit such as an ethylene oxide unit, a propylene oxide unit, and 1,2-butylene oxide unit; an epihalohydrin unit such as an epichlorohydrin unit, an epibromohydrin unit, and an epiiodohydrin unit; an alkenyl group-containing oxirane monomer unit such as an allyl glycidyl ether unit; an aromatic ether group-containing oxirane monomer unit such as a phenyl glycidyl ether unit; a (meth)acryloyl group-containing oxirane monomer unit such as a glycidyl acrylate unit and a glycidyl methacrylate unit; and the like. However, the oxirane monomer unit is not limited to these examples.

The polyether polymer used in the present invention may have two or more oxirane monomer units. Although a distribution pattern of those repeating units is not limited to a particular pattern in this case, a random distribution is preferred.

Further, the polyether polymer used in the present invention may be a cationic group-containing polyether polymer containing oxirane monomer units in which at least a part of the oxirane monomer units has a cationic group. Including the oxirane monomer units having a cationic group can appropriately prevent agglomeration of the filler after a lapse of long time, which thus allows the polyether polymer composition of the present invention to have excellent long-term stability.

The cationic group which can be included in the polyether polymer is not limited to a particular cationic group. However, from a viewpoint of the cationic group which is capable of appropriately enhancing an effect of improving dispersibility of the filler in the polyether polymer composition and an effect of preventing the agglomeration of the filler after a lapse of long time, the cationic group is preferably a cationic group in which atoms from group 15 or 16 of the periodic table have famed an onium cation structure, more preferably a cationic group in which nitrogen atoms have famed an onium cation structure, further preferably a cationic group in which nitrogen atoms in a nitrogen atom-containing aromatic heterocycle have famed an onium cation structure, particularly preferably a cationic group in which nitrogen atoms in an imidazolium ring have famed an onium cation structure.

Specific examples of the cationic group include an ammonium group such as an ammonium group, a methylammonium group, a butylammonium group, a cyclohexyl ammonium group, an anilinium group, a benzylammonium group, an ethanolammonium group, a dimethylammonium group, a diethylammonium group, a dibutylammonium group, a nonylphenylammonium group, a trimethylammonium group, a triethylammonium group, a n-butyldimethylammonium group, a n-octyldimethylammonium group, a n-stearyldimethylammonium group, a tributylammonium group, a trivinylammonium group, a triethanolammonium group, an N,N-dimethylethanolammonium group, and a tri(2-ethoxyethyl)ammonium group; a group containing a heterocyclic ring having a cationic nitrogen atom such as a piperidinium group, a 1-pyrrolidinium group, an imidazolium group, a 1-methylimidazolium group, a 1-ethylimidazolium group, a benzimidazolium group, a pyrrolium group, a 1-methylpyrrolium group, an oxazolium group, a benzoxazolium group, a benzisoxazolium group, a pyrazolium group, an isoxazolium group, a pyridinium group, a 2,6-dimethylpyridinium group, a pyrazinium group, a pyrimidinium group, a pyridazinium group, a triazinium group, an N,N-dimethylanilinium group, a quinolinium group, an isoquinolinium group, an indolinium group, an isoindolium group, a quinoxalium group, an isoquinoxalium group, and a thiazolium group; a group having a cationic phosphorus atom such as a triphenylphosphonium salt and a tributylphosphonium group; and the like. However, it is not limited to these examples. Among these examples, a group containing a heterocyclic ring having a cationic nitrogen atom such as an imidazolium group, a 1-methylimidazolium group, a 1-ethylimidazolium group, and a benzimidazolium group is preferred.

Although the cationic group generally has a counter anion, the counter anion is not limited to a particular one and examples thereof include a halide ion such as $Cl^-$, $Br^-$, and $I^-$, a sulfonylimide ion such as $(FSO_2)_2N^-$, $(CF_3SO_2)_2N^-$, and $(CF_3CF_2SO_2)_2N^-$, and further, $OH^-$, $SCN^-$, $BF_4^-$, $PF_6^-$, $ClO_4^-$, $CH_3SO_3^-$, $CF_3SO_3^-$, $CF_3COO^-$, $PhCOO^-$, and the like. These counter anions may be appropriately selected according to properties of a polyether polymer composition to be produced.

When the polyether polymer used in the present invention is a cationic group-containing polyether polymer, among oxirane monomer units composing the polyether polymer, at least a part of the oxirane monomer units may be an oxirane monomer unit having a cationic group and, for example, the oxirane monomer units composing the polyether polymer may all have a cationic group or may be a mix of the oxirane monomer units having a cationic group and the oxirane monomer units not having a cationic group. When the polyether polymer used in the present invention is a cationic group-containing polyether polymer, a proportion of oxirane monomer units having a cationic group is not limited to a particular proportion. However, it is preferably 5 mol % or more, more preferably 20 mol % or more, based on all oxirane monomer units of the polyether polymer. An upper limit of the proportion of the oxirane monomer units having a cationic group is not limited to a particular value.

When the polyether polymer used in the present invention is a cationic group-containing polyether polymer, a structure of the cationic group-containing polyether polymer is not particularly limited to a particular structure. However, a structure composed of a monomer unit represented by the following general formula (1) is preferred.

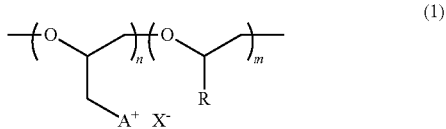 (1)

In the above general formula (1), $A^+$ represents a cationic group or a cationic group-containing group, $X^-$ represents any counter anion, R represents a non-ionic group, n is an integer of 1 or more, m is an integer of 0 or more, and n+m satisfies $10 \leq n+m \leq 200$.

In the above general formula (1), $A^+$ represents a cationic group or a cationic group-containing group. Specific examples of the cationic group are as described above, and specific examples of the cationic group-containing group include a group containing the cationic group as described above.

In the above general formula (1), $X^-$ represents any counter anion. Specific examples of the counter anion are as described above.

In the above general formula (1), R represents a non-ionic group and is not limited to a particular group as long as it is a non-ionic group. Examples thereof include a hydrogen atom; an alkyl group having 1 to 10 carbon atoms such as a methyl group, an ethyl group, a n-propyl group, an isopropyl group, a n-butyl group, an isobutyl group, and a t-butyl group; an alkenyl group having 2 to 10 carbon atoms such as a vinyl group, an allyl group, and a propenyl group; an alkynyl group having 2 to 10 carbon atoms such as an ethynyl group and a propynyl group; a cycloalkyl group having 3 to 20 carbon atoms such as a cyclopropyl group, a cyclobutyl group, a cyclopentyl group, and a cyclohexyl group; an aryl group having 6 to 20 carbon atoms such as a phenyl group, a 1-naphthyl group, and a 2-naphthyl group; and the like.

Among these examples, an alkyl group having 1 to 10 carbon atoms, an alkenyl group having 2 to 10 carbon atoms, an alkynyl group having 2 to 10 carbon atoms, a cycloalkyl group having 3 to 20 carbon atoms, and an aryl group having 6 to 20 carbon atoms may have a substituent at any position.

Examples of the substituent include an alkyl group having 1 to 6 carbon atoms such as a methyl group and an ethyl group; an alkoxy group having 1 to 6 carbon atoms such as a methoxy group, an ethoxy group, and an isopropoxy group; an alkenyloxy group having 2 to 6 carbon atoms such as a vinyloxy group and an allyloxy group; an aryl group which may have a substituent such as a phenyl group, a 4-methylphenyl group, a 2-chlorophenyl group, and a 3-methoxyphenyl group; a halogen atom such as a fluorine atom, a chlorine atom, and a bromine atom; an alkylcarbonyl group having 1 to 6 carbon atoms such as a methylcarbonyl group and an ethylcarbonyl group; a (meth)acryloyloxy group such as an acryloyloxy group and a methacryloyloxy group; and the like.

In the above general formula (1), n may be an integer of 1 or more, m may be an integer of 0 or more, and n+m satisfies 10 n+m 200. However, n is preferably an integer of 10 to 200, more preferably an integer of 20 to 190, and m is preferably an integer of 0 to 199, more preferably an integer of 0 to 190, further preferably an integer of 0 to 100, particularly preferably m=0. Further, n+m is an integer of 10 to 200, preferably an integer of 15 to 195, more preferably an integer of 20 to 190.

When a structure of the cationic group-containing polyether polymer is composed of a monomer unit represented by the above general formula (1), a polymer chain end is not limited to a particular group and may be any group. Examples of the polymer chain end include the above-described cationic groups, a hydroxy group, a hydrogen atom, and the like.

When the polyether polymer used in the present invention is a cationic group-containing polyether polymer, it may include two or more oxirane monomer units, and a distribution pattern of those repeating units is not limited to a particular pattern in this case and a random distribution is preferred. For example, the polyether polymer may include an oxirane monomer unit having two or more cationic groups, or alternatively, may include an oxirane monomer unit having one or two or more cationic groups and an oxirane monomer unit not having one or two or more cationic groups.

The polyether polymer used in the present invention is composed of 10 to 200 oxirane monomer units, preferably 15 to 195 oxirane monomer units, more preferably 20 to 190 oxirane monomer units. When the number of oxirane monomer units composing the polyether polymer is too large, a composition to be produced has no liquidity and thus is not capable of being produced as a grease form or a paste form. Therefore, the composition cannot be used for an application where the composition in a grease form or a paste form is used. In contrast, when the number of oxirane monomer units composing the polyether polymer is too small, the filler in a composition to be produced shows poor dispersibility, and further, the filler is agglomerated after a lapse of long time, which thus results in poor long-term stability. The number of oxirane monomer units of the polyether polymer is determined by a method described in EXAMPLES below.

Further, a number average molecular weight (Mn) of the polyether polymer used in the present invention is not limited to a particular value as long as the polyether polymer is composed of 10 to 200 oxirane monomer units. However, the number average molecular weight is preferably 300 to 150,000, more preferably 400 to 100,000, particularly preferably 500 to 80,000. A molecular weight distribution (Mw/Mn) is preferably 1.0 to 2.0, more preferably 1.0 to 1.5. The number average molecular weight and the molecular weight distribution of the polyether polymer can be determined by a method described in EXAMPLES below.

A chain structure of the polyether polymer used in the present invention is not limited to a particular structure and may be a straight chain or a chain structure having a branch such as a graft chain and a radial chain.

Although a method for synthesizing the polyether polymer used in the present invention is not limited to a particular method, any method for synthesizing that can produce a target polyether polymer can be employed. Examples of the method include a method for producing a polyether polymer, which is disclosed in the Japanese Patent Laid-Open No. 2010-53217, by ring-opening polymerization of a monomer containing an oxirane monomer in the presence of a catalyst composed of an onium salt which is a compound having an atom from group 15 or 16 of the periodic table and trialkylaluminum in which alkyl groups contained are all straight-chained alkyl group, and the like.

When the polyether polymer used in the present invention is a cationic group-containing polyether polymer, examples of a method for synthesizing the cationic group-containing polyether polymer include the following method: In the above method, at least epihalohydrin such as epichlorohydrin, epibromohydrin, and epiiodohydrin is used as a monomer to produce a polyether polymer not having a cationic group. The produced polyether polymer not having a cationic group is subjected to a reaction with an amine compound such as an imidazole compound to convert a halogen group composing the epihalohydrin monomer unit of the polyether polymer into an onium halide group. A halide ion composing the onium halide group is further subjected to an anion-exchange reaction, as necessary, to produce a cationic group-containing polyether polymer.

<Filler>

The polyether polymer composition of the present invention contains the above-described polyether polymer and a filler.

The filler used in the present invention is not limited to a particular filler in terms of its chemical structure, composition, shape, and size. However, the chemical structure of the filler may be any of an organic filler and an inorganic filler, and it is preferred that the inorganic filler is used.

The inorganic filler is not limited to a particular filler and examples thereof include a metal-containing powder, a carbon material, an inorganic material other than the metal-containing powder and the carbon material, and the like. Among these examples, the metal-containing powder is preferably used from the viewpoint that the polyether polymer composition of the present invention can be provided with high heat conductivity or high electrical conductivity.

Examples of the metal-containing powder used in the present invention may include a powder of a single metal or an alloy or a compound having a metal atom. However, a metal powder (a powder of a single metal or an alloy powder), a metal oxide powder, and a metal nitride powder are preferably used.

Examples of the metal powder include an aluminum powder, a gold powder, a silver powder, a copper powder, a nickel powder, an indium powder, a gallium powder, a metal silicon powder, and the like. Among these examples, the silver powder and the copper powder are preferably used.

Examples of the metal oxide powder include a zinc oxide powder, a silica powder, a titanium oxide powder, an alumina powder, a silver oxide powder, a zirconium oxide powder, a magnesium oxide powder, and the like. Among these examples, the zinc oxide powder is preferably used.

Examples of the metal nitride powder include a boron nitride powder, an aluminum nitride powder, and the like. Among these examples, the boron nitride powder is preferably used.

In the present invention, depending on properties of a polyether polymer composition to be produced, the metal-containing powder may be appropriately selected from the above examples, and these examples may be used singly or in combinations of two or more.

For example, when the polyether polymer composition of the present invention is used for an application that requires heat conductivity, a polyether polymer composition containing a metal oxide powder and a metal nitride powder as a metal-containing powder preferably in a total proportion of 10 to 2000 parts by weight, more preferably in a total proportion of 100 to 1750 parts by weight, further preferably in a total proportion of 200 to 1500 parts by weight, or a metal powder preferably in a proportion of 0 to 1990 parts by weight, more preferably in a proportion of 10 to 1500 parts by weight, further preferably in a proportion of 50 to 1000 parts by weight, per 100 parts by weight of the polyether polymer, is used. Including the metal oxide powder and the metal nitride powder, or the metal powder in a proportion of the above range allows the polyether polymer composition of the present invention to have particularly excellent heat conductivity.

When the polyether polymer composition of the present invention is used for an application that requires electrical conductivity, a polyether polymer composition containing a metal powder as a metal-containing powder preferably in a proportion of 50 to 2000 parts by weight, more preferably in a proportion of 100 to 1750 parts by weight, further preferably in a proportion of 200 to 1500 parts by weight, per 100 parts by weight of the polyether polymer, is used. Although the metal oxide powder and the metal nitride powder may be contained in the polyether polymer composition of the present invention, it is preferred that these powders are not substantially contained. Including the metal powder in a proportion of the above range allows the polyether polymer composition of the present invention to have particularly excellent electrical conductivity.

The carbon material is not limited to a particular material and examples thereof include carbon black, acetylene black, carbon fiber, graphite, and the like.

Examples of the inorganic material other than the metal-containing powder and the carbon material include a glass fiber, a glass powder, calcium carbonate, talc, clay, and the like.

When the carbon material and the inorganic material other than the metal-containing powder and the carbon material are used as a filler, these materials may be used alone or in combination with the above-described metal-containing powder. When the carbon material and the inorganic material other than the metal-containing powder and the carbon material are used in combination with the metal-containing powder, a content rate of the metal-containing powder in the filler is preferably 50 to 2000 parts by weight, more preferably 100 to 1750 parts by weight, further preferably 200 to 1500 parts by weight, per 100 parts by weight of the polyether polymer.

A shape of the filler used in the present invention is not limited to a particular shape and may be an indefinite shape besides a scale-like shape, a teardrop-like shape, a spherical shape, a needle shape, a fibrous shape, and an irregular shape. Additionally, a filler that has been surface treated beforehand may be used.

When the filler used in the present invention is a scale-like shape, a teardrop-like shape, a spherical shape, a needle shape, or the like, its size is not limited to a particular size. However, an average particle size is preferably 0.01 µm or more and less than 50 µm, more preferably 0.02 µm or more and less than 40 µm. When the average particle size is too large, smoothness of the polyether polymer composition of the present invention is lessened in some cases, and this results in an increase in contact resistance (heat resistance, electrical resistance) in some cases. When the average particle size is too small, on the other hand, contact points between fillers in the polyether polymer composition are lessened, and properties of the filler such as heat conductivity and electrical conductivity may not be shown sufficiently.

A content of the filler in the polyether polymer composition of the present invention is 50 parts by weight or more, preferably 100 parts by weight or more, more preferably 200 parts by weight or more, further preferably 400 parts by weight or more, particularly preferably 500 parts by weight or more, per 100 parts by weight of the polyether polymer. Although an upper limit of the content is not limited to a particular value, it is usually 2000 parts by weight or less. According to the polyether polymer composition of the present invention, even when a relatively large amount of the filler as described above is included, the filler can be dispersed well in the polyether polymer and this can suitably ensure the contact points between the fillers. For that reason, various properties of the filler such as high heat conductivity and high electrical conductivity can be appropriately shown. Additionally, according to the polyether polymer composition of the present invention, even when a relatively large amount of the filler as described above is included, the agglomeration of the filler can be effectively prevented even after a lapse of long time, and excellent long-term stability is provided.

In order to appropriately show properties of the filler such as high heat conductivity and high electrical conductivity in a conventional manner in particular, even when a relatively large amount of the filler as described above was included in various polymers, it was generally difficult for the filler to be dispersed well in a polymer. For that reason, in practical situations, properties of the filler such as high heat conductivity and high electrical conductivity could not be shown sufficiently in some cases, or even producing a composition in a grease form or a paste form was difficult in the first place. Further, even if it was possible to disperse the filler well, the filler was agglomerated after long-term use and as a result, the properties of the filler such as high heat conductivity and high electrical conductivity could not be shown sufficiently. In contrast to the above, the present invention effectively solves the above problems by using the above-described particular polyether polymer as a matrix polymer.

<Method for Producing Polyether Polymer Composition>

The polyether polymer composition of the present invention can be produced by mixing the above-described polyether polymer and the above-described filler. A method for mixing the polyether polymer and the filler is not limited to a particular method. However, a publicly known mixing method such as a mixing method with a shear force being applied by a mill, an automatic mortar, or a kneader, and a mixing method using ultrasonic waves can be employed.

Mixing of the polyether polymer and the filler may be performed in a solvent. The solvent used when performing the mixing in the solvent is not limited to a particular solvent. However, a polar solvent is preferably used in terms of the fact that the polar solvent allows the filler to be dispersed better in the polyether polymer. Examples of the polar solvent include ether such as tetrahydrofuran and anisole; ester such as ethyl acetate and ethyl benzoate; ketone such as acetone, 2-butanone, and acetophenone; an aprotic polar solvent such as acetonitrile, dimethylformamide, dimethylacetamide, dimethylsulfoxide, and methylpyrrolidone; a protic polar solvent such as ethanol, methanol, and water; and the like. These solvents may be used singly or can be used as a mixed solvent of two or more. An amount used of the solvent is not limited to a particular amount. However, the amount of the solvent may be set so that a total content rate of the polyether polymer and the filler in the solvent is in a range from 0.1 to 80% by weight.

A method for mixing the polyether polymer and the filler in the solvent is not limited to a particular method. However, a method for mixing by adding a polyether polymer in a suspension prepared by suspending a filler in a solvent may be employed, or a method for mixing by adding a filler in a solution prepared by dissolving a polyether polymer in a solvent may be employed. Mixing may be performed by stirring with a commonly used stirrer or may be performed with an ultrasonic disperser. Although a solution produced by mixing can be used directly as the polyether polymer composition of the present invention, a solution after a solvent is removed is preferably used. A method for removing a solvent is not limited to a particular method. For example, the solvent may be removed by evaporation or may be solidified by drying.

When mixing the polyether polymer and the filler without using a solvent, a method for mixing by adding a polyether polymer to a filler may be employed or a method for mixing by adding a filler to a polyether polymer may be employed, for example. In this case, mixing may be performed with a commonly used kneader or stirrer, or may be performed with a mill or an automatic mortar.

<Other Components>

The polyether polymer composition of the present invention may contain other components in addition to the polyether polymer and the filler. The other components are not limited to a particular component and examples thereof include a polymer material other than the above-described particular polyether polymer; an organic solvent; an ionic liquid; and the like. When a polyether polymer has a cross-linkable monomer unit, a cross-linker may be included therein to produce a cross-linkable composition, and in this case, a cross-linking aid or a cross-linking promoter may be included as necessary. In particular, the polyether polymer composition of the present invention produced as a cross-linkable composition in a grease form or a paste form is applied, coated, printed, or the like on a base material or the like, which is then subjected to cross-linking to produce a cross-linked product, and thereby it is possible to appropriately maintain the effects of the present invention, specifically the following effects: various properties of a filler such as high heat conductivity and high electrical conductivity can be appropriately shown and also excellent long-term stability can be provided; and at the same time, mechanical strength as a structural material can be improved. The cross-linker may be selected according to a structure of a cross-linkable monomer unit to be used and the like, and is not limited to a particular cross-linker.

The polymer material other than the above-described particular polyether polymer is not limited to a particular material and examples thereof include a rubber material such as an acrylonitrile-butadiene rubber, a styrene-butadiene rubber, a butadiene rubber, an isoprene rubber, an acrylic rubber, an ethylene-propylene rubber, a urethane rubber, a fluororubber, and a silicon rubber; a thermoplastic elastomer material such as styrene-isoprene-styrene, styrene-butadiene-styrene, and styrene-ethylene-butadiene-styrene; a resin material such as PMMA, polyethylene, polypropylene, polystyrene, polycarbonate, ABS, vinyl chloride, and PET; a photo-curable or thermosetting resin such as an epoxy resin, a urethane resin, and a thermosetting or photo-curable acrylate resin; and the like.

According to the above, the polyether polymer composition of the present invention contains 50 parts by weight or more of the filler per 100 parts by weight of the above-described particular polyether polymer. According to the polyether polymer composition of the present invention, as the filler can be dispersed well in the polyether polymer, various properties of the filler such as high heat conductivity and high electrical conductivity can be appropriately shown, and further, the agglomeration of the filler can be effectively prevented even after a lapse of long time and excellent long-term stability is provided. In particular, the polyether polymer composition of the present invention is capable of being famed into a grease form or a paste form, which therefore can be suitably used as various greases and pastes such as a heat dissipating grease having high heat conductivity and excellent long-term stability and an electrically conductive paste having high electrical conductivity and excellent long-term stability.

EXAMPLES

Hereinafter, the present invention will be described with reference to more detailed examples. However, the present invention is not limited to these examples. Note that the term "part(s)" mentioned below is based on weight unless otherwise noted. Further, tests and evaluations were conducted in accordance with the description below.

(1) Number of Repeating Units, Number Average Molecular Weight (Mn), and Molecular Weight Distribution (Mw/Mn) of Polyether Polymer Regarding a number average molecular weight (Mn) and a molecular weight distribution (Mw/Mn) of a polyether polymer not having a cationic group, gel permeation chromatography (GPC) with tetrahydrofuran as a solvent was used to measure the number average molecular weight (Mn) and the molecular weight distribution (Mw/Mn) of the polyether polymer which are calculated as a polystyrene equivalent value. HLC-8320 (manufactured by Tosoh Corporation) was used as a measuring instrument in which two columns of TSKgela-M (manufactured by Tosoh Corporation) were connected in series and the differential refractometer RI-8320 (manufactured by Tosoh Corporation) was used as a detector. The resultant number average molecular weight was divided by a molecular weight of repeating units composing the polyether polymer to calculate the number of the repeating units.

A number average molecular weight of the cationic group-containing polyether polymer is determined as follows. That is, first of all, an average molecular weight of all repeating units composing the polyether polymer having a cationic group is determined from an average molecular weight of repeating units of the polyether polymer not having a cationic group in which the cationic group has not yet been introduced, an average molecular weight of oxirane monomer units having a cationic group, and a content rate of the oxirane monomer units having a cationic group determined by (2) below. Then, the number of repeating units of the polyether polymer not having a cationic group in which a cationic group has not yet been introduced was multiplied by the average molecular weight of the all repeating units composing the cationic group-containing polyether polymer, and the resultant value was determined as the number average molecular weight of the cationic group-containing polyether polymer.

A molecular weight distribution of the cationic group-containing polyether polymer was used as it is, assuming that the molecular weight distribution was not changed from the molecular weight distribution of the polyether polymer not having a cationic group in which a cationic group has not yet been introduced.

(2) Structure of Polyether Polymer and Content Rate of Oxirane Monomer Unit Having Cationic Group A structure of the polyether polymer and a content rate of an oxirane monomer unit having a cationic group in a cationic group-containing polyether polymer were measured as follows using a nuclear magnetic resonator (NMR). That is, 30 mg of a sample polyether polymer was added to 1.0 mL of deuterated chloroform or deuterated dimethylsulfoxide, which was shaken for 1 hour so that the sample polyether polymer was dissolved uniformly. The resultant solution was then subjected to an NMR measurement to obtain $^1$H-NMR spectrum, and a structure of the polyether polymer was determined in accordance with a usual method.

Further, the content rate of the oxirane monomer unit having a cationic group in the cationic group-containing polyether polymer was calculated by the following method. That is, first of all, a mole number B1 of all oxirane monomer units was calculated from an integrated value of a proton derived from an oxirane monomer unit as a main chain. Next, a mole number B2 of the oxirane monomer unit having a cationic group was calculated from an integrated value of a proton derived from a cationic group. Then, a rate of B2 relative to B1 (percentage) was determined as the content rate of the oxirane monomer unit having a cationic group in the cationic group-containing polyether polymer.

(3) Heat Conductivity

Heat conductivity of each polymer composition 5 days after the production of the polymer composition was measured with a heat conductivity measurement device ("MentorGraphics DynTIM Tester" manufactured by Mentor Graphics Japan Co., Ltd.) using the following method. That is, each sample polymer composition was famed into a disk-shaped test piece having a size of φ12.8 mm, which was hand-pressed to adjust a thickness so that the thickness of each sample was in a range from 0.1 mm to 1.0 mm to prepare a plurality of measurement samples each having a different thickness. The prepared measurement sample was sandwiched between a heated portion and a measurement portion of the heat conductivity measurement device with a measurement temperature difference between the heated portion and the measurement portion being 10° C., and heat resistance in a thickness direction was measured in a measurement environment in which an atmosphere is 25° C. This heat resistance measurement was performed on the plurality of measurement samples each having a different thickness, and the produced measurement results were then plotted using a linear approximate expression to calculate the heat conductivity.

Further, the above heat conductivity measurement was also pertained on the polymer compositions 5 days after the production of each polymer composition as well as on the polymer compositions 2 months after the production. These measurement results were compared to check their long-term stability.

(4) Electrical Conductivity

Electrical conductivity of each polymer composition was measured using polymer compositions 5 days after the production of the polymer composition with a low resistivity meter ("Loresta-GP" manufactured by Mitsubishi Chemical Analytech Co., Ltd. A PSP probe was selected as a 4-point probe.) using the following method in accordance with JIS K 7194. First of all, 1.0 g of each sample polymer composition was press-molded at a temperature ranging from 100° C. to 150° C. and a pressure ranging from 0.1 to 1.0 MPa to form a thin film having a thickness of 100 to 500 μm, which was subsequently cut into a square shape of 10×10 mm to prepare a measurement sample. Next, the prepared measurement sample was secured to an insulating board of the low resistivity meter, and the probe was pressed against the center of one side (side A) of the measurement sample and then a voltage of 10 V was applied to measure a resistance value of the measurement sample. Based on the resistance value obtained from the measurement, a size of a measurement sample, and a measurement position, surface resistance (unit: Ω/□) was determined using an arithmetic equation that has been internally stored in the low resistivity meter. This measurement was also performed on the other side (side B) of the measurement sample in the same manner as above to calculate an average value of the surface resistance measured with respect to the side A and side B, and the calculated average value was determined as the surface resistance of the measurement sample.

Further, the above measurement of the surface resistance was also pertained on the polymer compositions that have been left for 2 months in addition to the polymer compositions that have been left for 5 days since the production of each polymer composition. These measurement results were compared to check long-term stability.

(5) Dispersibility After Storing for a Long Time

A dispersed state-retaining property of each polymer composition was morphologically observed by a scanning electron microscope (SEM) to evaluate long-term stability. More specifically, with the above-mentioned morphological observation, dispersibility after storing for a long time was evaluated in accordance with the following standards. It can be determined that the more excellent the dispersibility after storing for a long time is, the more excellent the long-term stability is.

Very good: The matrix polymer and the metal-containing powder as a filler retained a good dispersed state even 2 months after the production of the polymer composition.

Good: Although the matrix polymer and the metal-containing powder as a filler showed a good dispersed state for 1 week after the production of the polymer composition, the dispersed state was slightly deteriorated 2 months after the production.

Poor: When a polymer composition was produced, the polymer composition was not capable of being famed into a grease form or a paste form and was ended up in a powder form. Either that, or when a polymer composition was produced, the polymer composition was capable of being famed into a grease form or a paste form, but agglomeration of the metal-containing powder as a filler was confirmed 5 days after the production.

Production Example 1

(Synthesis of Polyether Polymer A)

To a glass reactor vessel purged with argon and equipped with a stirrer, 3.22 g of tetranormalbutylammonium bromide and 100 ml of toluene were added and then cooled to 0° C. Next, 1.370 g of triethylaluminum (1.2 equivalents based on tetranormalbutylammonium bromide) dissolved in 10 ml of normal hexane was added to allow a reaction to proceed for 15 minutes to produce a catalyst composition. To the resultant catalyst composition, 35.0 g of epichlorohydrin was added to carry out a polymerization reaction at 0° C. After the polymerization reaction was initiated, viscosity of the solution was gradually increased. After the reaction proceeded for 12 hours, a small amount of water was poured into the polymerization reaction solution to stop the reaction. The resultant polymerization reaction solution was washed with 0.1 N of a hydrochloric acid aqueous solution to remove a catalyst residue and was further washed with ion-exchange water. After that, an organic phase was dried under reduced pressure at 50° C. for 12 hours. As a result, an oil-like substance was produced in a yield of 34.6 g. According to GPC performed on the produced oil-like substance, a number average molecular weight (Mn) was 3,500, a molecular weight distribution (Mw/Mn) was 1.4, and the number of repeating units (the number of oxirane monomer units) was 37. Based on the above, the produced oil-like substance was identified as polyether polymer A composed of an epichlorohydrin unit having a bromomethyl group at a polymerization-initiating end and a hydroxy group at a polymerization-terminating end.

Production Example 2

(Synthesis of Imidazolium Structure-Containing Polyether Polymer B)

5.0 g of polyether polymer A produced in Production Example 1, 6.1 g of 1-methylimidazole, and 10.0 g of acetonitrile were added to a glass reactor vessel purged with argon and equipped with a stirrer, and then heated to 80° C. After the reaction proceeded at 80° C. for 48 hours, the solution was cooled to a room temperature to stop the reaction. The resultant mixture was washed with an equal weight mixed solution of toluene/methanol/water, and then an organic phase containing 1-methylimidazole and toluene was removed and an aqueous phase was dried under reduced pressure at 50° C. for 12 hours, which eventually produced 6.35 g of a light reddish solid. This solid was determined by a $^1$H-NMR measurement and elemental analysis. As a result, the solid was identified as imidazolium structure-containing polyether polymer B having a halide ion as a counter anion in which, in polyether polymer A (polyepichlorohydrin) that is a starting material, a part of a chloro group included in repeating units was substituted with a 1-methylimidazolium group having a chloride ion as a counter anion and a bromo group of a bromomethyl group at a polymerization-initiating end was substituted with a 1-methylimidazolium group having a bromide ion as a counter anion. According to imidazolium structure-containing polyether polymer B, a number average molecular weight (Mn) was 4,300, a molecular weight distribution (Mw/Mn) was 1.4, and the number of repeating units (the number of oxirane monomer units) was 37. Further, a content rate of the oxirane monomer unit having a 1-methylimidazolium group as a cationic group measured in accordance with the above method was 30 mol %.

Production Example 3

(Synthesis of Imidazolium Structure-Containing Polyether Polymer C)

5.0 g of polyether polymer A produced in Production Example 1, 12.1 g of 1-methylimidazole, and 10.0 g of acetonitrile were added to a glass reactor vessel purged with argon and equipped with a stirrer, and heated to 80° C. After the reaction proceeded at 80° C. for 48 hours, the solution was cooled to a room temperature to stop the reaction. The resultant mixture was washed with an equal weight mixed solution of toluene/methanol/water, and then an organic phase containing 1-methylimidazole and toluene was removed and an aqueous phase was dried under reduced pressure at 50° C. for 12 hours, which eventually produced 9.4 g of a light reddish solid. This solid was determined by a $^1$H-NMR measurement and elemental analysis. As a result, the solid was identified as imidazolium structure-containing polyether polymer C having a halide ion as a counter anion in which, in polyether polymer A (polyepichlorohydrin) that is a starting material, all chloro groups included in repeating units were substituted with a 1-methylimidazolium group having a chloride ion as a counter anion and a bromo group of a bromomethyl group at a polymerization-initiating end was substituted with a 1-methylimidazolium group having a bromide ion as a counter anion. According to imidazolium structure-containing polyether polymer C, a number average molecular weight (Mn) was 6,500, a molecular weight distribution (Mw/Mn) was 1.4, and the number of repeating units (the number of oxirane monomer units) was 37. Further, a content rate of the oxirane monomer unit having a 1-methylimidazolium group as a cationic group measured in accordance with the above method was 100 mol %.

Production Example 4

(Synthesis of Imidazolium Structure-Containing Polyether Polymer D)

2.5 g of imidazolium structure-containing polyether compound C having a halide ion as a counter anion produced in Production Example 3, 4.1 g of lithium bis(trifluoromethanesulfonyl)imide, and 20 mL of ion-exchange water were added to a glass reactor vessel equipped with a stirrer. After the reaction proceeded at a room temperature for 30 minutes, the solution was dried under reduced pressure at 50° C. for 12 hours. The resultant solid-liquid mixture was washed with water to remove an inorganic salt, and then a liquid phase was extracted with toluene. The resultant toluene solution was dried under reduced pressure at 50° C. for 12 hours, which eventually produced 5.7 g of a viscous liquid-form substance. The produced viscous liquid-form substance was determined by a $^1$H-NMR spectrum measurement and elemental analysis. As a result, the viscous liquid-form substance was identified as imidazolium structure-containing polyether polymer D having a bis(trifluoromethanesulfonyl)imide anion as a counter anion in which all chloride ions and bromide ions of imidazolium structure-containing polyether compound having a halide ion as a counter anion that is a starting material were substituted with a bis(trifluoromethanesulfonyl)imide anion. According to imidazolium structure-containing polyether polymer D, a number average molecular weight (Mn) was 15,500, a molecular weight distribution (Mw/Mn) was 1.4, and the number of repeating units (the number of oxirane monomer units) was 37. Further, a content rate of the oxirane monomer unit having a 1-methylimidazolium group as a cationic group measured in accordance with the above method was 100 mol %.

Production Example 5

(Synthesis of Imidazolium Structure-Containing Polyether Polymer E)

To a glass reactor vessel purged with argon and equipped with a stirrer, 0.322 g of tetranormalbutylammonium bromide and 50 ml of toluene were added and cooled to 0° C. Next, 0.171 g of triethylaluminum (1.5 equivalents based on tetranormalbutylammonium bromide) dissolved in 10 ml of normal hexane was added to allow a reaction to proceed for 15 minutes to produce a catalyst composition. To the resultant catalyst composition, 17.0 g of epichlorohydrin was added to carry out a polymerization reaction at 0° C. After the polymerization reaction was initiated, viscosity of the solution was gradually increased. After the reaction proceeded for 12 hours, a small amount of water was poured into the polymerization reaction solution to stop the reaction. The resultant polymerization reaction solution was washed with 0.1 N of a hydrochloric acid aqueous solution to remove a catalyst residue and was further washed with ion-exchange water. After that, an organic phase was dried under reduced pressure at 50° C. for 12 hours. As a result, an oil-like substance was produced in a yield of 17.0 g. According to GPC performed on the produced oil-like substance, a number average molecular weight (Mn) was 17100, a molecular weight distribution (Mw/Mn) was 1.2, and the number of repeating units (the number of oxirane monomer units) was 185. Based on the above, the produced oil-like substance was identified as polyether polymer E" composed of an epichlorohydrin unit having a bromomethyl group at a polymerization-initiating end and a hydroxy group at a polymerization-terminating end.

Next, 5.0 g of polyether polymer E" produced as above, 12.1 g of 1-methylimidazole, and 10.0 g of acetonitrile were added to a glass reactor vessel purged with argon and equipped with a stirrer, and heated to 80° C. After the reaction proceeded at 80° C. for 48 hours, the solution was cooled to a room temperature to stop the reaction. The resultant mixture was washed with an equal weight mixed solution of toluene/methanol/water, and then an organic phase containing 1-methylimidazole and toluene was removed and an aqueous phase was dried under reduced pressure at 50° C. for 12 hours, which eventually produced 9.4 g of a light reddish solid. This solid was determined by a $^1$H-NMR measurement and elemental analysis. As a result, the solid was identified as imidazolium structure-containing polyether polymer E' having a halide ion as a counter anion in which, in polyether polymer E" that is a starting material, all chloro groups included in repeating units were substituted with a 1-methylimidazolium group having a chloride ion as a counter anion and a bromo group of a bromomethyl group at a polymerization-initiating end was substituted with a 1-methylimidazolium group having a bromide ion as a counter anion. Further, a content rate of the oxirane monomer unit having a 1-methylimidazolium group as a cationic group measured in accordance with the above method was 100 mol %.

Then, 2.5 g of imidazolium structure-containing polyether polymer E' having a halide ion as a counter anion produced as above, 4.1 g of lithium bis(trifluoromethanesulfonyl) imide, and 20 mL of ion-exchange water were added to a glass reactor vessel equipped with a stirrer. After the reaction proceeded at a room temperature for 30 minutes, the solution was dried under reduced pressure at 50° C. for 12 hours. The resultant solid-liquid mixture was washed with water to remove an inorganic salt, and then a liquid phase was extracted with toluene. The resultant toluene solution was dried under reduced pressure at 50° C. for 12 hours, which eventually produced 5.7 g of a viscous liquid-fain substance. The produced viscous liquid-form substance was determined by a $^1$H-NMR spectrum measurement and elemental analysis. As a result, the viscous liquid-fain substance was identified as imidazolium structure-containing polyether polymer E having a bis(trifluoromethanesulfonyl)imide anion as a counter anion in which all chloride ions and bromide ions of imidazolium structure-containing polyether polymer E' having a halide ion as a counter anion that is a starting material were substituted with a bis(trifluoromethanesulfonyl)imide anion. According to imidazolium structure-containing polyether polymer E, a number average molecular weight (Mn) was 78,000, a molecular weight distribution (Mw/Mn) was 1.2, and the number of repeating units (the number of oxirane monomer units) was 185. Further, a content rate of the oxirane monomer unit having a 1-methylimidazolium group as a cationic group measured in accordance with the above method was 100 mol %.

Production Example 6

(Synthesis of Imidazolium Structure-Containing Polyether Polymer F)

To a glass reactor vessel purged with argon and equipped with a stirrer, 3.22 g of tetranormalbutylammonium bromide and 100 ml of toluene were added and then cooled to 0° C. Next, 1.370 g of triethylaluminum (1.2 equivalents based on tetranormalbutylammonium bromide) dissolved in 10 ml of normal hexane was added to allow a reaction to proceed for 15 minutes to produce a catalyst composition. To the resultant catalyst composition, 12.5 g of epichlorohydrin and 7.5 g of propylene oxide were added to carry out a polymerization reaction at 0° C. After the polymerization reaction was initiated, viscosity of the solution was gradually increased. After the reaction proceeded for 12 hours, a small amount of water was poured into the polymerization reaction solution to stop the reaction. The resultant polymerization reaction solution was washed with 0.1 N of a hydrochloric acid aqueous solution to remove a catalyst residue and was further washed with ion-exchange water. After that, an organic phase was dried under reduced pressure at 50° C. for 12 hours. As a result, an oil-like substance was produced in a yield of 19.9 g. According to GPC performed on the produced oil-like substance, a number average molecular weight (Mn) was 2030, a molecular weight distribution (Mw/Mn) was 1.3, and the number of repeating units (the number of oxirane monomer units) was 27. Based on the above, the produced oil-like substance was identified as polyether polymer F' composed of an epichlorohydrin unit and a propylene oxide unit that has a bromomethyl group at a polymerization-initiating end and a hydroxy group at a polymerization-terminating end. Further, a monomer composition ratio of the epichlorohydrin monomer unit to the propylene oxide monomer unit in polyether polymer F' was 50 mol % to 50 mol %.

Next, 5.0 g of polyether polymer F' produced as above, 12.1 g of 1-methylimidazole, and 10.0 g of acetonitrile were added to a glass reactor vessel purged with argon and equipped with a stirrer, and heated to 80° C. After the reaction proceeded at 80° C. for 48 hours, the solution was cooled to a room temperature to stop the reaction. The resultant mixture was washed with an equal weight mixed solution of toluene/methanol/water, and then an organic phase containing 1-methylimidazole and toluene was removed and an aqueous phase was dried under reduced pressure at 50° C. for 12 hours, which eventually produced 7.7 g of a light reddish solid. This solid was determined by a $^1$H-NMR measurement and elemental analysis. As a result, the solid was identified as imidazolium structure-containing polyether polymer F having a halide ion as a counter anion in which, in polyether polymer F' that is a starting material, all chloro groups included in repeating units were substituted with a 1-methylimidazolium group having a chloride ion as a counter anion and a bromo group of a bromomethyl group at a polymerization-initiating end was substituted with a 1-methylimidazolium group having a bromide ion as a counter anion. According to imidazolium structure-containing polyether polymer F, a number average molecular weight (Mn) was 6,500, a molecular weight distribution (Mw/Mn) was 1.3, and the number of repeating units (the number of oxirane monomer units) was 27. Further, a content rate of the oxirane monomer unit having a 1-methylimidazolium group as a cationic group measured in accordance with the above method was 50 mol %.

Production Example 7

(Synthesis of Imidazolium Structure-Containing Polyether Polymer G)

To a glass reactor vessel purged with argon and equipped with a stirrer, 0.32 g of tetranormalbutylammonium bromide and 50 ml of toluene were added and cooled to 0° C. Next, 0.171 g of triethylaluminum (1.5 equivalents based on tetranormalbutylammonium bromide) dissolved in 10 ml of normal hexane was added to allow a reaction to proceed for 15 minutes to produce a catalyst composition. To the resultant catalyst composition, 14.0 g of epichlorohydrin was added to carry out a polymerization reaction at 0° C. After the polymerization reaction was initiated, viscosity of the solution was gradually increased. After the reaction proceeded for 12 hours, a small amount of water was poured into the polymerization reaction solution to stop the reaction. The resultant polymerization reaction solution was washed with 0.1 N of a hydrochloric acid aqueous solution to remove a catalyst residue and was further washed with ion-exchange water. After that, an organic phase was dried under reduced pressure at 50° C. for 12 hours. As a result, an oil-like substance was produced in a yield of 13.8 g. According to GPC performed on the produced oil-like substance, a number average molecular weight (Mn) was 14000, a molecular weight distribution (Mw/Mn) was 1.2, and the number of repeating units (the number of oxirane monomer units) was 152. Based on the above, the produced oil-like substance was identified as polyether polymer G' composed of an epichlorohydrin unit having a bromomethyl group at a polymerization-initiating end and a hydroxy group at a polymerization-terminating end.

Next, 5.0 g of polyether polymer G' produced as above, 12.1 g of 1-methylimidazole, and 10.0 g of acetonitrile were added to a glass reactor vessel purged with argon and equipped with a stirrer, and heated to 80° C. After the reaction proceeded at 80° C. for 48 hours, the solution was cooled to a room temperature to stop the reaction. The resultant mixture was washed with an equal weight mixed solution of toluene/methanol/water, and then an organic phase containing 1-methylimidazole and toluene was removed and an aqueous phase was dried under reduced pressure at 50° C. for 12 hours, which eventually produced 9.3 g of a light reddish solid. This solid was determined by a $^1$H-NMR measurement and elemental analysis. As a result, the solid was identified as imidazolium structure-containing polyether polymer G having a halide ion as a counter anion in which, in polyether polymer G' that is a starting material, all chloro groups included in repeating units were substituted with a 1-methylimidazolium group having a chloride ion as a counter anion and a bromo group of a bromomethyl group at a polymerization-initiating end was substituted with a 1-methylimidazolium group having a bromide ion as a counter anion. According to imidazolium structure-containing polyether polymer G, a number average molecular weight (Mn) was 26,700, a molecular weight distribution (Mw/Mn) was 1.2, and the number of repeating units (the number of oxirane monomer units) was 152. Further, a content rate of the oxirane monomer unit having a 1-methylimidazolium group as a cationic group measured in accordance with the above method was 100 mol %.

Example 1

100 parts of polyether polymer A produced in Production Example 1, 407 parts of a zinc oxide powder (manufactured by KANTO CHEMICAL CO., INC., average particle size of 5 to 10 μm) and 207 parts of a silver powder (manufactured by Sigma-Aldrich, Co. LLC, average particle size of 5 to 8 μm) as an inorganic filler, and 714 parts of N,N'-dimethylacetamide (DMAc) as a solvent were put into an automatic mortar and then mixed at a room temperature for 30 minutes. The resultant composition was further mixed while heating and then further dried under conditions that the resultant composition was dried in a vacuum dryer of 0.01 MPa or less at 60° C. for 12 hours or more, which produced a grease-form polymer composition. Measurements and an evaluation of heat conductivity and dispersibility after storing for a long time were performed on the produced grease-form heat dissipating polymer composition in accordance with the above method. The results are shown in Table 1.

Example 2

A grease-form heat dissipating polymer composition was produced in the same manner as in Example 1 except that 100 parts of imidazolium structure-containing polyether polymer B produced in Production Example 2 was used instead of polyether polymer A produced in Example 1 and in addition, 207 parts of a copper powder (manufactured by Sigma-Aldrich, Co. LLC, average particle size of 14 to 25 μm) was used instead of the silver powder, and the measurements and the evaluation were performed in the same manner as above. The results are shown in Table 1.

Example 3

A grease-form heat dissipating polymer composition was produced in the same manner as in Example 1 except that 100 parts of imidazolium structure-containing polyether polymer C produced in Production Example 3 was used instead of polyether polymer A produced in Production Example 1, and the measurements and the evaluation were performed in the same manner as above. The results are shown in Table 1.

Example 4

A grease-form heat dissipating polymer composition was produced in the same manner as in Example 1 except that 100 parts of imidazolium structure-containing polyether polymer D produced in Production Example 4 was used instead of polyether polymer A produced in Production Example 1, and the measurements and the evaluation were pertained in the same manner as above. The results are shown in Table 1.

Example 5

A grease-form heat dissipating polymer composition was produced in the same manner as in Example 1 except that 100 parts of imidazolium structure-containing polyether polymer E produced in Production Example 5 was used instead of polyether polymer A produced in Production Example 1 and in addition, 207 parts of a copper powder (manufactured by Sigma-Aldrich, Co. LLC, average particle size of 14 to 25 μm) was used instead of the silver powder, and the measurements and the evaluation were performed in the same manner as above. The results are shown in Table 1.

Example 6

A grease-form heat dissipating polymer composition was produced in the same manner as in Example 1 except that 100 parts of imidazolium structure-containing polyether polymer F produced in Production Example 6 was used instead of polyether polymer A produced in Production Example 1 and in addition, 207 parts of a copper powder (manufactured by Sigma-Aldrich, Co. LLC, average particle size of 14 to 25 μm) was used instead of the silver powder, and the measurements and the evaluation were performed in the same manner as above. The results are shown in Table 1.

Example 7

A grease-form heat dissipating polymer composition was produced in the same manner as in Example 1 except that 100 parts of imidazolium structure-containing polyether polymer D produced in Production Example 4 was used instead of polyether polymer A produced in Production Example 1 and in addition, 210 parts of a boron nitride powder (manufactured by Denka Company Limited, average particle size of 10 to 18 μm) was used instead of the zinc oxide powder and the silver powder, and the measurements and the evaluation were pertained in the same manner as above. The results are shown in Table 1.

Example 8

A grease-form heat dissipating polymer composition was produced in the same manner as in Example 1 except that 100 parts of imidazolium structure-containing polyether polymer E produced in Production Example 5 was used instead of polyether polymer A produced in Production Example 1 and in addition, 300 parts of a boron nitride powder (manufactured by Denka Company Limited, average particle size of 10 to 18 μm) was used instead of the zinc oxide powder and the silver powder, and the measurements and the evaluation were performed in the same manner as above. The results are shown in Table 1.

Comparative Example 1

A heat dissipating polymer composition was produced in the same manner as in Example 1 except that 100 parts of a liquid-form butadiene rubber (manufactured by Sigma-Aldrich, Co. LLC, number average molecular weight: 3,000, molecular weight distribution: 1.5) was used instead of polyether polymer A produced in Production Example 1 and in addition, 714 parts of toluene was used as a solvent instead of N,N'-dimethylacetamide (DMAc). Further, although the heat dissipating polymer composition produced in Comparative Example 1 was in a grease form immediately after the production, the zinc oxide powder and the silver powder were agglomerated as time went by and the composition turned into a powder form after 5 days. Measurements and an evaluation were performed on such a powder-form heat dissipating polymer composition in accordance with the above method. In Comparative Example 1, an attempt was made to measure heat conductivity of a disk-shaped test piece that has been left for 2 months. However, keeping the shape of the test piece was difficult, so that the test piece was unmeasurable. The results are shown in Table 2.

Comparative Example 2

A heat dissipating polymer composition was produced in the same manner as in Comparative Example 1 except that 100 parts of a liquid-form silicone rubber (manufactured by Gelest, Inc., number average molecular weight: 6,000, molecular weight distribution: 2.1) was used instead of the liquid-fain butadiene rubber. Since the heat dissipating polymer composition produced in Comparative Example 2 was agglomerated in a powder form, it was not capable of being produced as a grease-form composition. The measurements and the evaluation were performed on the produced powder-form heat dissipating polymer composition in accordance with the above method. In Comparative Example 2, an attempt was made to measure heat conductivity of a disk-shaped test piece that has been left for 2 months. However, keeping the shape of the test piece was difficult, so that the test piece was unmeasurable. The results are shown in Table 2.

Comparative Example 3

A heat dissipating polymer composition was produced in the same manner as in Comparative Example 1 except that 100 parts of a high-molecular-weight styrene-butadiene rubber (number average molecular weight: 250,000, molecular weight distribution: 2.6) was used instead of the liquid-form butadiene rubber and in addition, 207 parts of the copper powder (manufactured by Sigma-Aldrich, Co. LLC, average particle size of 14 to 25 μm) was used instead of the silver powder. Since the heat dissipating polymer composition produced in Comparative Example 3 was agglomerated in a powder form, it was not capable of being produced as a grease-form composition. The measurements and the evaluation were performed on the produced powder-form heat dissipating polymer composition in accordance with the above method. In Comparative Example 3, an attempt was made to measure heat conductivity of a disk-shaped test piece that has been left for 2 months. However, keeping the shape of the test piece was difficult, so that the test piece was unmeasurable. The results are shown in Table 2.

Comparative Example 4

A heat dissipating polymer composition was produced in the same manner as in Comparative Example 1 except that 100 parts of a high-molecular-weight silicone rubber (number average molecular weight: 63,000, molecular weight distribution: 2.3) was used instead of the liquid-fain butadiene rubber and in addition, 207 parts of the copper powder (manufactured by Sigma-Aldrich, Co. LLC, average particle size of 14 to 25 μm) was used instead of the silver powder. Since the heat dissipating polymer composition produced in Comparative Example 4 was agglomerated in a powder form, it was not capable of being produced as a grease-form composition. The measurements and the evaluation were performed on the produced powder-form heat dissipating polymer composition in accordance with the above method. In Comparative Example 4, an attempt was made to measure heat conductivity of disk-shaped test pieces that each have been left for 5 days and 2 months since the production. However, keeping the shape of the test pieces was difficult, so that the test pieces were unmeasurable. The results are shown in Table 2.

TABLE 1

| | | | Example 1 | Example 2 | Example 3 | Example 4 | Example 5 | Example 6 | Example 7 | Example 8 |
|---|---|---|---|---|---|---|---|---|---|---|
| Kind of polymer | | | Polyether polymer A | Imidazolium structure-containing polyether polymer B | Imidazolium structure-containing polyether polymer C | Imidazolium structure-containing polyether polymer D | Imidazolium structure-containing polyether polymer E | Imidazolium structure-containing polyether polymer F | Imidazole structure-containing polyether polymer D | Imidazole structure-containing polyether polymer E |
| Number of oxirane monomer units | | | 37 | 37 | 37 | 37 | 185 | 27 | 37 | 185 |
| Mn of polymer | | | 3,500 | 4,300 | 6,500 | 15,500 | 78,000 | 6,500 | 15,500 | 78,000 |
| Mw/Mn of polymer | | | 1.4 | 1.4 | 1.4 | 1.4 | 1.2 | 1.3 | 1.4 | 1.2 |
| Content ratio of oxirane monomer unit having cationic group | | (mol %) | — | 30 | 100 | 100 | 100 | 50 | 100 | 100 |
| Composition | Polymer | (part(s)) | 100 | 100 | 100 | 100 | 100 | 100 | 100 | 100 |
| | Zinc oxide powder | (part(s)) | 407 | 407 | 407 | 407 | 407 | 407 | — | — |
| | Copper powder | (part(s)) | — | — | — | — | 207 | 207 | — | — |

TABLE 1-continued

|  |  | Example 1 | Example 2 | Example 3 | Example 4 | Example 5 | Example 6 | Example 7 | Example 8 |
|---|---|---|---|---|---|---|---|---|---|
| Silver powder | (part(s)) | 207 | — | 207 | 207 | — | — | — | — |
| Boron nitride powder | (part(s)) | — | — | — | — | — | — | 210 | 300 |
| Initial form of sample |  | Grease form | Grease form | Grease form | Grease form | Grease form | Grease form | Grease form | Grease form |
| Heat conductivity after 5 days | (W/(m · K)) | 1.95 | 1.87 | 1.53 | 2.56 | 2.38 | 2.11 | 3.00 | 3.92 |
| Heat conductivity after 2 months | (W/(m · K)) | 1.06 | 1.85 | 1.54 | 2.56 | 2.34 | 2.10 | 2.99 | 3.93 |
| Dispersibility after storing for a long time |  | Good | Very Good | Very Good | Very Good | Very Good | Very Good | Very Good | Very Good |

TABLE 2

|  |  | Comparative Example 1 | Comparative Example 2 | Comparative Example 3 | Comparative Example 4 |
|---|---|---|---|---|---|
| Kind of polymer |  | Liquid-form butadiene rubber | Liquid-form silicone rubber | Styrene-butadiene rubber | Silicone rubber |
| Number of oxirane monomer units |  | — | — | — | — |
| Mn of polymer |  | 3,000 | 6,000 | 250,000 | 63,000 |
| Mw/Mn of polymer |  | 1.5 | 2.2 | 2.1 | 2.3 |
| Content ratio of oxirane monomer unit having cationic group | (mol %) | — | — | — | — |
| Composition Polymer | (part(s)) | 100 | 100 | 100 | 100 |
| Zinc oxide powder | (part(s)) | 407 | 407 | 407 | 407 |
| Copper powder | (part(s)) | — | — | 207 | 207 |
| Silver powder | (part(s)) | 207 | 207 | — | — |
| Initial form of sample |  | Grease form to powder form | Powder form | Powder form | Powder form |
| Heat conductivity after 5 days | (W/(m · K)) | 0.3 | 0.2 or less | 0.2 or less | Unmeasurable |
| Surface resistance after 2 months | (W/(m · K)) | Unmeasurable | Unmeasurable | Unmeasurable | Unmeasurable |
| Dispersibility after storing for a long time |  | Poor | Poor | Poor | Poor |

Evaluation of Heat Dissipating Polymer Composition (Examples 1 to 8, Comparative Examples 1 to 4)

As shown in Table 1 and Table 2, a polyether polymer composition containing 50 parts or more of a metal-containing powder as a filler per 100 parts of a polyether polymer composed of 10 to 200 oxirane monomer units was capable of being produced as a grease-form composition and also had high heat conductivity after 5 days from the production which was excellent heat conductivity. Further, the heat conductivity was suitably maintained even after 2 months and in addition, dispersibility after storing for a long time was also good which was excellent stability in storing for a long time. For that reason, the polyether polymer composition was capable of being suitably used as a heat dissipating grease (Examples 1 to 8).

On the other hand, when a liquid-form butadiene rubber, a liquid-fain silicone rubber, a styrene-butadiene rubber, and a silicone rubber were each used instead of the polyether polymer composed of 10 to 200 oxirane monomer units, dispersibility of each polymer and the metal-containing powder as a filler was poor and none of them were capable of being produced as a grease-form composition or the composition tamed into a powder form as time went by even though the grease-form composition was produced. Further, the heat conductivity and the stability in storing for a long time were also poor (Comparative Examples 1 to 4).

Example 9

100 parts of polyether polymer A produced in Production Example 1, 233 parts of the silver powder (manufactured by Sigma-Aldrich, Co. LLC, average particle size of 5 to 8 µm) as an inorganic filler, and 333 parts of N,N'-dimethylacetamide (DMAc) as a solvent were put into an automatic mortar and then mixed at a room temperature for 30 minutes. The resultant composition was further mixed while heating, and then further dried under conditions that the resultant composition was dried in a vacuum dryer of 0.01 MPa or less at 60° C. for 12 hours or more, which produced a paste-form polymer composition. Measurements and an evaluation of surface resistance (electrical conductivity) and dispersibility after storing for a long time were performed on the produced paste-form electrically conductive polymer composition in accordance with the above method. The results are shown in Table 3.

Example 10

A paste-form electrically conductive polymer composition was produced in the same manner as in Example 9 except that 100 parts of imidazolium structure-containing polyether polymer B produced in Production Example 2 was used instead of polyether polymer A produced in Production Example 1, and the measurements and the evaluation were performed in the same manner as above. The results are shown in Table 3.

Example 11

A paste-form electrically conductive polymer composition was produced in the same manner as in Example 10 except that an amount used of the silver powder was changed from 233 parts to 400 parts, and the measurements and the evaluation were performed in the same manner as above. The results are shown in Table 3.

Example 12

A paste-form electrically conductive polymer composition was produced in the same manner as in Example 9 except that 100 parts of imidazolium structure-containing polyether polymer G produced in Production Example 7 was used instead of polyether polymer A produced in Production Example 1 and in addition, an amount used of the silver powder was changed from 233 parts to 900 parts, and the measurements and the evaluation were performed in the same manner as above. The results are shown in Table 3.

Example 13

A paste-form electrically conductive polymer composition was produced in the same manner as in Example 9 except that 100 parts of imidazolium structure-containing polyether polymer D produced in Production Example 4 was used instead of polyether polymer A produced in Production Example 1, and the measurements and the evaluation were performed in the same manner as above. The results are shown in Table 3.

Comparative Example 5

An electrically conductive polymer composition was produced in the same manner as in Example 9 except that 100 parts of a liquid-form butadiene rubber (manufactured by Sigma-Aldrich, Co. LLC, number average molecular weight: 3,000, molecular weight distribution: 1.5) was used instead of polyether polymer A produced in Production Example 1 and in addition, 333 parts of toluene was used as a solvent instead of N,N'-dimethylacetamide (DMAc). Although the electrically conductive polymer composition produced in Comparative Example 5 was a paste form immediately after the production, the silver powder was agglomerated as time went by and the composition turned into a powder form after 5 days. Measurements and an evaluation were pertained on such a powder-form electrically conductive polymer composition in accordance with the above method. In Comparative Example 5, an attempt was made to measure surface resistance (electrical conductivity) of a test piece that has been left for 2 months. However, keeping the shape of the test piece was difficult, so that the test piece was unmeasurable. The results are shown in Table 4.

Comparative Example 6

An electrically conductive polymer composition was produced in the same manner as in Comparative Example 5 except that 100 parts of a liquid-form silicone rubber (manufactured by Gelest, Inc., number average molecular weight: 6,000, molecular weight distribution: 2.1) was used instead of the liquid-form butadiene rubber. Since the electrically conductive polymer composition produced in Comparative Example 6 was agglomerated in a powder form, it was not capable of being produced as a paste-form composition. The measurements and the evaluation were performed on the produced powder-form electrically conductive polymer composition in accordance with the above method. In Comparative Example 6, an attempt was made to measure surface resistance (electrical conductivity) of test pieces that each have been left for 5 days and 2 months from the production. However, keeping the shape of the test pieces was difficult, so that the test pieces were unmeasurable. The results are shown in Table 4.

Comparative Example 7

An electrically conductive polymer composition was produced in the same manner as in Comparative Example 5 except that 100 parts of a high-molecular-weight styrene-butadiene rubber (number average molecular weight: 250,000, molecular weight distribution: 2.6) was used instead of the liquid-form butadiene rubber. Since the electrically conductive polymer composition produced in Comparative Example 7 was agglomerated in a powder form, it was not capable of being produced as a paste-form composition. The measurements and the evaluation were performed on the produced powder-form electrically conductive polymer composition in accordance with the above method. In Comparative Example 7, an attempt was made to measure surface resistance (electrical conductivity) of test pieces that each have been left for 5 days and 2 months from the production. However, keeping the shape of the test pieces was difficult, so that the test pieces were unmeasurable. The results are shown in Table 4.

Comparative Example 8

An electrically conductive polymer composition was produced in the same manner as in Comparative Example 5 except that 100 parts of a high-molecular-weight silicone rubber (number average molecular weight: 63,000, molecular weight distribution: 2.3) was used instead of the liquid-form butadiene rubber. Since the electrically conductive polymer composition produced in Comparative Example 8 was agglomerated in a powder form, it was not capable of being produced as a paste-form composition. The measurements and the evaluation were performed on the produced powder-form electrically conductive polymer composition in accordance with the above method. In Comparative Example 8, an attempt was made to measure surface resistance (electrical conductivity) of test pieces that each have been left for 5 days and 2 months from the production. However, keeping the shape of the test pieces was difficult, so that the test pieces were unmeasurable. The results are shown in Table 4.

TABLE 3

|  |  | Example 9 | Example 10 | Example 11 | Example 12 | Example 13 |
|---|---|---|---|---|---|---|
| Kind of polymer |  | Polyether polymer A | Imidazolium structure-containing polyether polymer B | Imidazolium structure-containing polyether polymer B | Imidazolium structure-containing polyether polymer G | Imidazolium structure-containing polyether polymer D |
| Number of oxirane monomer units |  | 37 | 37 | 37 | 152 | 37 |
| Mn of polymer |  | 3,500 | 4,300 | 4,300 | 26,700 | 15,500 |
| Mw/Mn of polymer |  | 1.4 | 1.4 | 1.4 | 1.2 | 1.2 |
| Content ratio of oxirane monomer unit having cationic group (mol %) |  | — | 30 | 30 | 30 | 100 |
| Composition | Polymer (part(s)) | 100 | 100 | 100 | 100 | 100 |
|  | Zinc oxide powder (part(s)) | — | — | — | — | — |
|  | Copper powder (part(s)) | — | — | — | — | — |
|  | Silver powder (part(s)) | 233 | 233 | 400 | 900 | 233 |
| Initial form of sample |  | Paste form | Paste form | Paste form | Paste form | Paste form |
| Surface resistance after 5 days ($\Omega/\square$) |  | $2.3 \times 10^0$ | $8.2 \times 10^{-1}$ | $5.2 \times 10^{-3}$ | $6.9 \times 10^{-4}$ | $1.6 \times 10^1$ |
| Surface resistance after 2 months ($\Omega/\square$) |  | $7.2 \times 10^2$ | $8.5 \times 10^{-1}$ | $4.7 \times 10^{-3}$ | $6.4 \times 10^{-4}$ | $2.0 \times 10^1$ |
| Dispersibility after storing for a long time |  | Good | Very Good | Very Good | Very Good | Very Good |

TABLE 4

|  |  | Comparative Example 5 | Comparative Example 6 | Comparative Example 7 | Comparative Example 8 |
|---|---|---|---|---|---|
| Kind of polymer |  | Liquid-form butadiene rubber | Liquid-form silicone rubber | Styrene-butadiene rubber | Silicone rubber |
| Number of oxirane monomer units |  | — | — | — | — |
| Mn of polymer |  | 3,000 | 6,000 | 250,000 | 63,000 |
| Mw/Mn of polymer |  | 1.5 | 2.2 | 2.1 | 2.3 |
| Content ratio of oxirane monomer unit having cationic group (mol %) |  | — | — | — | — |
| Composition | Polymer (part(s)) | 100 | 100 | 100 | 100 |
|  | Zinc oxide powder (part(s)) | — | — | — | — |
|  | Copper powder (part(s)) | — | — | — | — |
|  | Silver powder (part(s)) | 233 | 233 | 233 | 233 |
| Initial form of sample |  | Paste form to powder form | Powder form | Powder form | Powder form |
| Surface resistance after 5 days ($\Omega/\square$) |  | $10^8$ or more | Unmeasurable | Unmeasurable | Unmeasurable |
| Surface resistance after 2 months ($\Omega/\square$) |  | Unmeasurable | Unmeasurable | Unmeasurable | Unmeasurable |
| Dispersibility after storing for a long time |  | Poor | Poor | Poor | Poor |

Evaluation of Electrically Conductive Polymer Composition (Examples 9 to 13, Comparative Examples 5 to 8)

As shown in Tables 3 and 4, a polyether polymer composition containing 50 parts or more of a metal-containing powder as a filler per 100 parts of a polyether polymer composed of 10 to 200 oxirane monomer units was capable of being produced as a paste form composition and also had low surface resistance 5 days after the production which was excellent electrical conductivity. Further, the low surface resistance was suitably maintained even after 2 months and in addition, dispersibility after storing for a long time was also good which was excellent stability in storing for a long time. For that reason, the polyether polymer composition was capable of being suitably used as an electrically conductive paste (Examples 9 to 13).

On the other hand, when a liquid-form butadiene rubber, a liquid-form silicone rubber, a styrene-butadiene rubber, and a silicone rubber were each used instead of the polyether polymer composed of 10 to 200 oxirane monomer units, dispersibility of each polymer and the metal-containing powder as a filler was poor. Further, the electrical conductivity and the stability in storing for a long time were also poor (Comparative Examples 5 to 8).

The invention claimed is:

1. A polyether polymer composition comprising 50 parts by weight or more of a filler per 100 parts by weight of a polyether polymer composed of 10 to 200 oxirane monomer units.

2. The polyether polymer composition according to claim 1, wherein the filler is a metal-containing powder.

3. The polyether polymer composition according to claim 2, wherein the metal-containing powder is at least one selected from a metal powder, a metal oxide powder, and a metal nitride powder.

4. The polyether polymer composition according to claim 1, wherein at least a part of the oxirane monomer unit composing the polyether polymer is an oxirane monomer unit having a cationic group.

5. The polyether polymer composition according to claim 4, wherein the polyether polymer comprises a monomer unit represented by the following general formula (1):

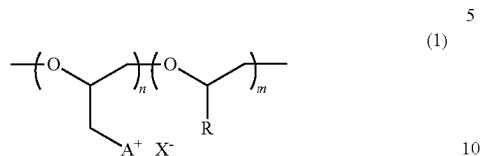

wherein $A^+$ represents a cationic group or a cationic group-containing group, $X^-$ represents any counter anion, R represents a non-ionic group, n is an integer of 1 or more, m is an integer of 0 or more, and n+m satisfies $10 \leq n+m \leq 200$.

6. The polyether polymer composition according to claim 4, wherein the cationic group comprises a heterocyclic ring having a cationic nitrogen atom.

7. The polyether polymer composition according to claim 1, wherein an average particle size of the filler is 0.01 μm or more and less than 50 μm.

8. The polyether polymer composition according to claim 1 being a heat dissipating polymer composition.

9. The polyether polymer composition according to claim 1 being an electrically conductive polymer composition.

10. The polyether polymer composition according to claim 1 being in a grease form or a paste form.

* * * * *